United States Patent
Mitchell et al.

(10) Patent No.: US 7,467,298 B2
(45) Date of Patent: Dec. 16, 2008

(54) METHODS AND ARRANGEMENTS FOR SELECTIVELY MAINTAINING PARENTAL ACCESS CONSENT IN A NETWORK ENVIRONMENT

(75) Inventors: Christopher E. Mitchell, Sammamish, WA (US); Wei-Quiang Michael Guo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1505 days.

(21) Appl. No.: 09/836,584

(22) Filed: Apr. 16, 2001

(65) Prior Publication Data

US 2002/0184496 A1 Dec. 5, 2002

(51) Int. Cl.
*H04L 9/00* (2006.01)
(52) U.S. Cl. ............... 713/168; 713/182; 713/183; 713/184; 711/100; 711/163; 711/164; 715/733; 715/738; 705/72; 705/76; 726/5; 726/7; 726/19
(58) Field of Classification Search ............ 713/168, 713/200, 201, 182, 184; 707/9; 709/229, 709/202; 714/763, 805, 809; 715/733, 738; 711/100, 163, 164; 705/18, 76, 72; 726/5, 726/7, 19
See application file for complete search history.

(56) References Cited

U.S. PATENT DOCUMENTS

| | | | | |
|---|---|---|---|---|
| 5,678,041 A | * | 10/1997 | Baker et al. | 707/9 |
| 6,233,686 B1 | * | 5/2001 | Zenchelsky et al. | 713/201 |
| 6,418,472 B1 | * | 7/2002 | Mi et al. | 709/229 |

* cited by examiner

*Primary Examiner*—Thanhnga B Truong
(74) *Attorney, Agent, or Firm*—Lee & Hayes, PLLC

(57) ABSTRACT

Methods and arrangements are provided which associate a first user with a second user in a first device, and selectively provide information about the association of the first and second user to a second device as directed by the first user, without requiring the second user to be logged in to either the first or second device. The information about the association of the first and second user is provided to the second device via a validation code or validation protocol that essentially identifies the first user and the second user, when the first user is logged in to the second device. Here, for example, the validation code may identify the second user by an identifier and a name, and possibly provide modifications to a consent parameter associated with the second user. In certain implementations, at least a portion of the validation code may be encrypted when sent from the first device to the second device. By way of example, in certain instances, the first user may be a parent/guardian to the second user. The first device may include a network server that is configured to act as an authentication server, and the second device may include a network server that is configured to act as an affiliated server associated with the authentication server.

36 Claims, 8 Drawing Sheets

METHODS AND ARRANGEMENTS FOR SELECTIVELY MAINTAINING PARENTAL ACCESS CONSENT IN A NETWORK ENVIRONMENT

TECHNICAL FIELD

The present invention relates generally to computers and computer networks, and more particularly to improved methods and arrangements for use in granting access to network servers, and selectively maintaining parental consent to access such network servers.

BACKGROUND

In recent years, the Internet has led to an explosion of information and resources. The Internet, generally, is comprised of various web sites operated by network servers where the sites provide information or perform services for accessing users. Once a user accesses a web site, the site can collect, track, and sell personal information relating to the user. Thus, the Internet raises concerns for the privacy and well being of its users.

One such concern is for the safety of children who utilize the Internet. In order to minimize this concern, the Children's Online Privacy Protection Act (COPPA) was enacted in the United States of America and became effective on Apr. 21, 2000. COPPA applies to two groups of web site operators. First, COPPA applies to an operator of a commercial Web site or an online service directed to children under 13 that collects personal information from children. Second, COPPA applies to an operator of a general audience web site that has actual knowledge that it is collecting personal information from children.

COPPA establishes, inter alia, that certain web site operators take actions such as, for example, posting privacy policies, notifying parents of information practices, obtaining verifiable parental consent, and providing parents with access to children's information. Consequently, many web site operators have had to make their sites COPPA-compliant. However, one such difficulty that web site operators face is the time and cost of in fact becoming COPPA compliant and maintaining compliance. Such difficulty has led many web site operators to completely block children from their web sites. Needless to say, such a solution is overly broad.

Therefore, a need exists for methods and arrangements for obtaining and modifying parental consent for an operator of a web site, whereby a web site operator may easily and conveniently comply with COPPA. Additionally, there is a need for improved methods and arrangements that provide parents with the capability to easily access and/or edit in some manner their children's information at any affiliated web server.

SUMMARY

Methods and arrangements are provided for obtaining and modifying parental consent and allowing parents to easily access and/or edit in some manner their children's information at any affiliated server.

For example, in accordance with certain implementations of the present invention, a method is provided which includes associating a first user with a second user in a first device, and selectively providing information about the association of the first and second user to a second device as directed by the first user, without requiring the second user to be logged in to either the first or second device.

The step of selectively providing information about the association of the first and second user to the second device may further include providing the second device with a validation code that identifies the first user and the second user, when the first user is logged in to the second device. Here, for example, the validation code may identify the second user by an identifier and a name, and possible provide modifications to a consent parameter associated with the second user. In certain implementations, at least a portion of the validation code may be encrypted when sent from the first device to the second device. By way of example, in certain instances, the first user may be a parent/guardian to the second user.

In some implementations, the first device includes a network server that is configured to act as an authentication server, and the second device includes a network server that is configured to act as an affiliated server associated with the authentication server.

The above stated needs and others are also met by an apparatus that includes, for example, a memory having information associating a first user of the apparatus with a second user of the apparatus, and logic that is operatively coupled to the memory and configured to respond to inputs from the first user by selectively outputting the information about the association of the first user and the second user, without requiring the second user to be operatively signed-in to the apparatus.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
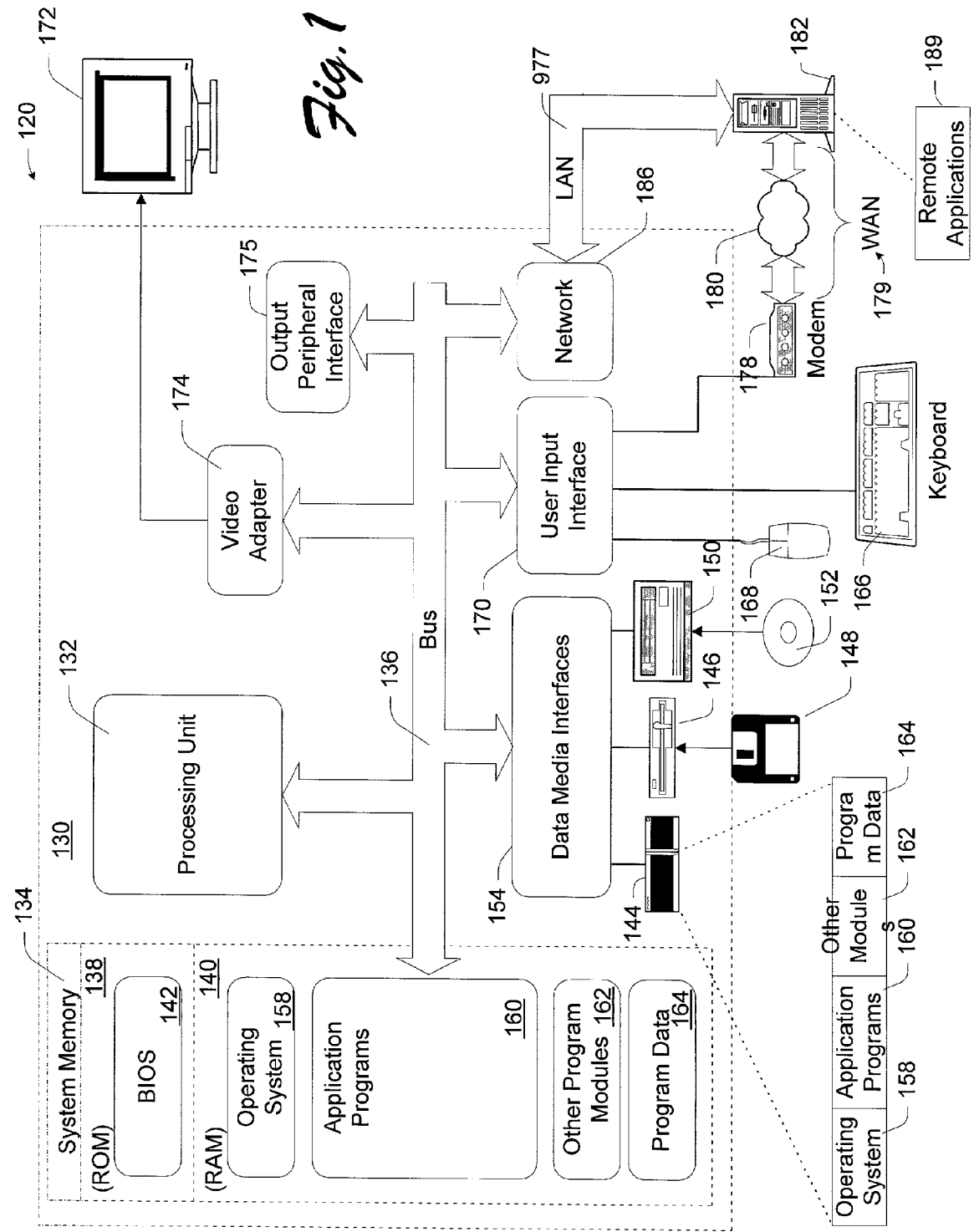
FIG. 1 is a block diagram that depicts an exemplary device, in the form of a computer, which is suitable for use with certain implementations of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a server computer, which may take the form of a personal computer, a workstation, a dedicated server, a plurality of processors, a mainframe computer, etc. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

With this general computing environment in mind, and in particular a networked client server based computer networking arrangement, a more detailed description will now be provided for multiple party authentication/consent schemes that can be implemented in a variety of networking arrangements.

In accordance with certain exemplary implementations, consent information is obtained from a first party, where such information allows a second party access to a network server that requires such consent information to access the server. After initially obtaining the consent information, the obtained consent information can then be stored, for example, in a user profile of the second party. The user profile is a collection of information that may include information such as, for example, the user's name, password, email address, personal preferences and/or various other information about the user.

Once the consent information has been stored in the user profile of the second party, the second party may then access the network server and network facilities, such as, for example, web sites operated in conjunction with the network server for which consent has been given. Importantly, however, only the first party has the capability to access and selectively modify the consent information in the user profile of the second party.

By way of example, the first party may modify the consent information through his/her own user profile. In this manner, a user profile of the first party is created and logically linked to the user profile of the second party. This allows the first party to access and modify such consent information stored in the user profile of the second party via the user profile of the first party. In still other implementations, the first party may directly enter the user profile of the second party and modify such consent information.

The user profile of the second party is used to access an affiliate network server in conjunction with an authentication server. In this manner, the decision to allow or deny the second party access to an affiliate server is dependent on the consent information contained in the user profile of the second party.

The exemplary implementations presented herein are described in terms of obtaining and modifying parental consent over the Internet by way of an affiliate server and authentication server for allowing a child to access a network server. Nevertheless, it should be appreciated that the consent may be present in other contexts such as, for example, employer-employee consent, spousal consent or the like without departing from the scope of the present invention. Moreover, such consent may be obtained through other networking environments such as, for example, a company's Intranet, a private networking environment, or the like.

Figure 2:
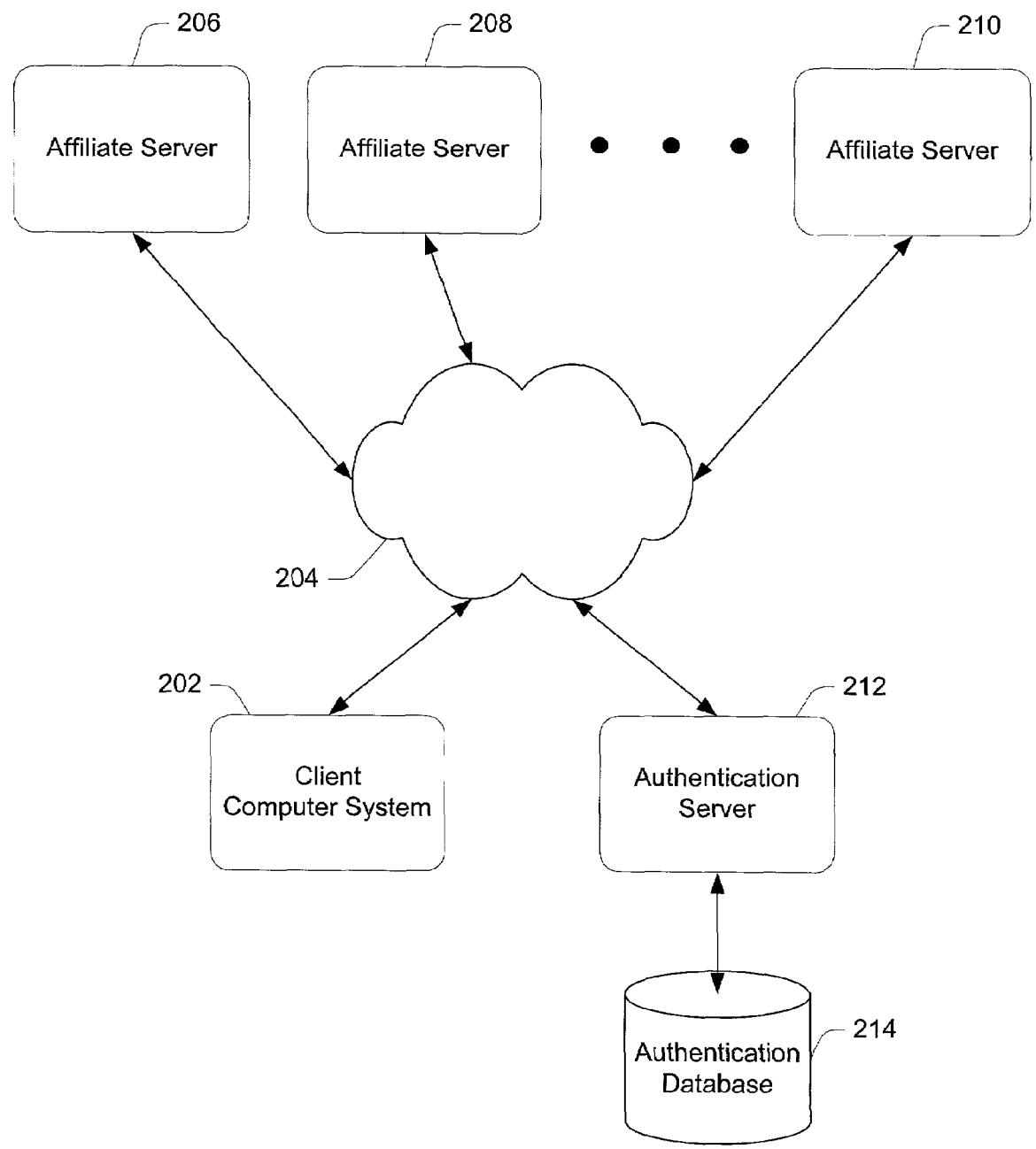
FIG. 2 is a block diagram depicting a networking environment, in accordance with certain exemplary implementations of the present invention.

With this in mind, the block diagram in FIG. 2 illustrates an exemplary network environment 200 having a client computer system 202 operatively coupled to a network 204. In this example, network 204 includes the Internet. However, as mentioned, the methods and arrangements herein can be applied to any data communication network(s).

Multiple affiliate servers 206, 208, and 210 are coupled to network 204, thereby allowing client computer system 202 to access such servers 206, 208, and 210 via network 204. Affiliate servers 206, 208, and 210 may also be referred to as "web servers" or "network servers". An authentication server 212 is also coupled to network 204, allowing communication between the authentication server 212 and client computer system 202 and affiliate servers 206, 208, and 210. Although referred to as an "authentication server", authentication server 212 may also be a web server or network server capable of interacting with client computer system 202 and web servers 206, 208, and 210.

In this example, data is communicated between authentication server 212, client computer system 202, and affiliate servers 204, 206, 208 using the Hypertext Transfer Protocol (HTTP), which protocol is commonly used on the Internet to exchange information. Nevertheless, other protocols may be used without departing from the scope of the invention.

An authentication database 214 is coupled to authentication server 212. Authentication database 214 includes information necessary to authenticate users and also identifies which elements of the user profile information should be provided to a particular affiliate server 206, 208, 210 when the user accesses the affiliate server. Although authentication database 214 is shown separately from the authentication server 212 in this example, in certain implementations, authentication database 214 may be provided within authentication server 212.

The term "affiliate server" is defined herein as a web server or network server that has "registered" or otherwise established a relationship or affiliation with authentication server 212. Each affiliate server 206, 208, 210 includes a code sequence (not shown) that allows the affiliate server to communicate with authentication server 212 when a user (who is also registered with the authentication server) requests access to the affiliate server. Additional details regarding the authentication process and the interaction between the client computer, the affiliate servers, and the authentication server are provided below.

Prior to executing the authentication process described below, both the user of client computer system 202 and the operator(s) of affiliate servers 206, 208, 210 register with authentication server 212. Registration is a one-time process that provides necessary information to authentication server 212. The user of client computer system 202 registers by providing information such as the user's name, mailing address, email address, and various other information about the user and/or client computer system 202.

As part of the user registration process, the user is assigned (or selects) a login ID, which is a common login ID used to access any affiliate server 206, 206, 210. The login ID may also be referred to herein as a "user name" or "login name". Additionally, the user selects a password associated with the login ID that is used for authentication purposes. After registering and logging into authentication server 212, a user may visit any affiliate server 206, 208, 210 (i.e., affiliate servers that are also registered with authentication server 212), typically without requiring any additional authentication and without re-entering user information that is already contained in the user profile for the user.

The operator(s) of affiliate servers 206, 208, 210 also register with authentication server 212 by providing information about affiliate server 206, 208, 210 (e.g., server name, Internet address, etc). Additionally, affiliate server 206, 208, 210 provides information regarding its authentication requirements.

For example, certain exemplary authentication requirements specify the maximum time allowed since the last login and entry of authentication information by the user as well as the maximum time allowed since the last "refresh" of the authentication information by the user. Refreshing the authentication information refers to the process of having the user re-enter the password to be certain that the appropriate user is still operating the client computer system 202. This periodic refreshing of authentication information is useful if the user leaves the client computer system 202 without logging out of the authentication server 212, thereby perhaps allowing another individual to access affiliate servers 206, 208, 210 using the login ID of the previous user.

If a user requests access to an affiliate server 206, 208, 210 after the maximum time allowed thereby, then the user will need to be re-authenticated (i.e., refreshed) by authentication server 212. Thus, although there is a central authentication server 212 in this example, each individual affiliate server 206, 208, 210 can establish its own authentication requirements that are enforced by authentication server 212.

After registering with authentication server 212, the affiliate server 206, 208, 210 can use the authentication server 212 to authenticate any user that has also registered with authentication server 212.

Figure 3:
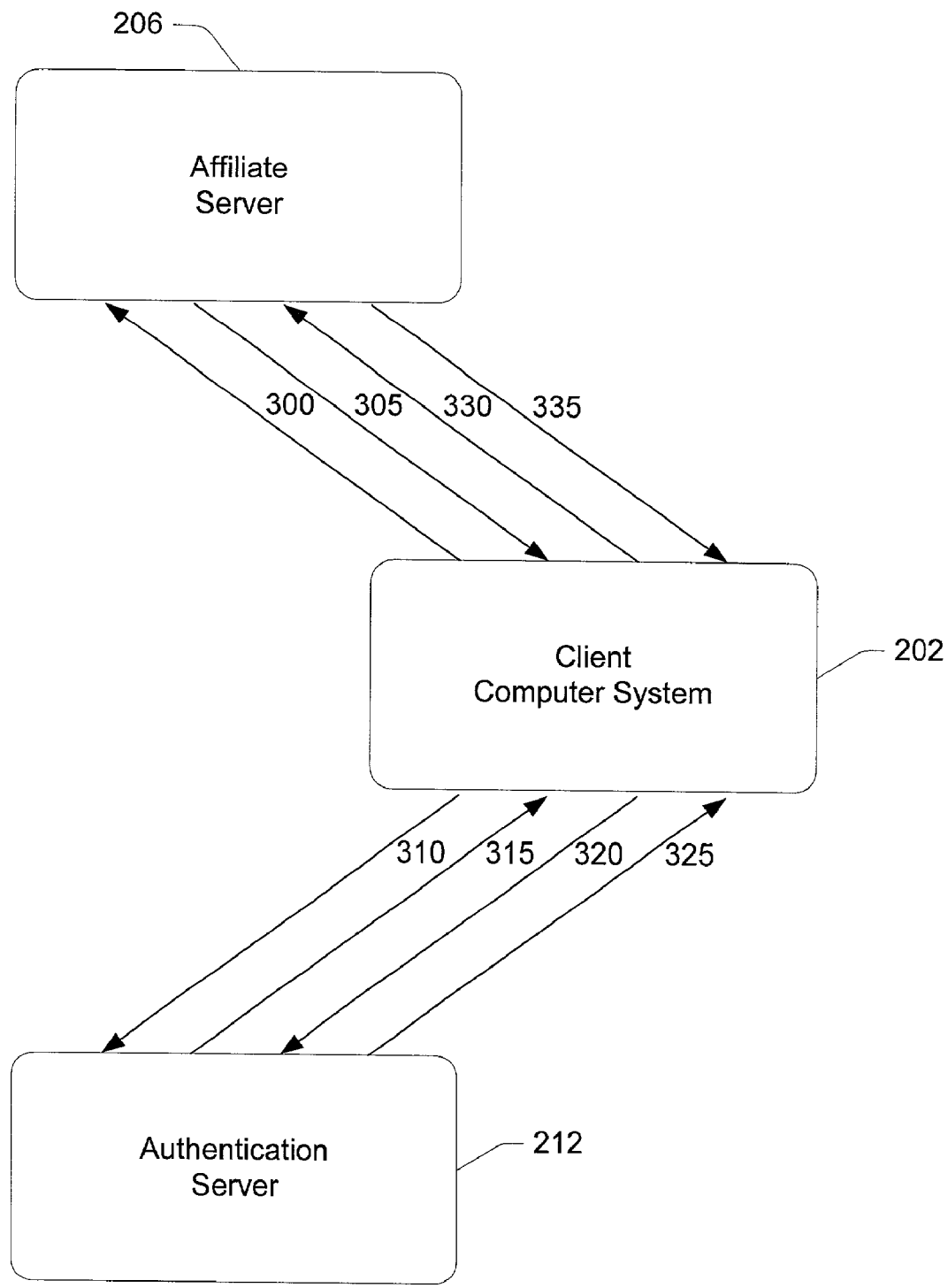
FIG. 3 is a flow diagram illustrating an authentication process associated with a user of a client computer system seeking to access an affiliate server, in accordance with certain exemplary implementations of the present invention.

FIG. 3 is a flow diagram that illustrates in an exemplary manner the authentication process when a user of client computer system 202 seeks access to affiliate server 206.

The process begins when the user of client computer system 202 accesses a web page or the like on affiliate server 206, at step 300. Client computer system 202 typically includes a web browser, such as the INTERNET EXPLORER web browser, a product of MICROSOFT Corporation of Redmond, Washington, for accessing various web sites. Affiliate server 206 determines whether the user seeking access to the server is already logged into affiliate server 206 (e.g., authenticated). In this example, the user is not logged into affiliate server 206, so the user must be authenticated before affiliate server 206 will allow access. To authenticate the user, affiliate server 206 redirects the user's browser to the authentication server 212, as demonstrated by steps 305 and 310.

In this example, the user has not yet logged into authentication server 212. Thus, authentication server 212 generates a sign-in web page and communicates the web page to client computer system 202 for display on the user's browser, as demonstrated by step 315. The sign-in web page requests the user's login ID and password, which were established when the user registered with authentication server 212. In this example, the user fills-in the requested information on the sign-in web page and clicks a "sign-in" button on the web page to send the information entered to the authentication server, as shown in step 320.

Upon receiving the information from the user of client computer system 202, authentication server 212 compares the entered information with the information stored in authentication database 214 (FIG. 2). If the user entered information is not correct (i.e., does not match the information stored in authentication database 214), then authentication server 212 generates and communicates a web page to the user indicating the login ID and password combination were not valid. Here, for example, the web page may give the user an opportunity to re-enter the login ID and password.

Confidential information (such as the login ID and password) is preferably communicated using a secure protocol, such as, for example, secure sockets layer (SSL). Various other secure protocols or encryption mechanisms may also be used to communicate confidential information between authentication server 212 and client computer system 202.

If the user-entered information is correct (i.e., matches the information stored in authentication database 214), then authentication server 212 transmits one or more appropriate cookies to the client computer system 202 and redirects the user's browser to the affiliate server, as shown in step 325.

As may be appreciated, a "cookie" is a piece of data provided to a web browser by a web server. The data (i.e., cookie) is sent back to the web server by the web browser during subsequent accesses to the web server. With respect to step 325, it may be the case that one cookie contains information regarding the date and time that the user was authenticated by authentication server 212 and another cookie contains information regarding the user profile for the user. Authentication server 212 may also update or create a list cookie that contains a list of all sites (or web servers) visited by the user since the last logout from authentication server 212. The cookie is updated by adding the current affiliate server 206 to the list of sites visited. Such list of sites visited as embodied within the list cookie may be used to remove cookies from client computer system 202 when the user logs out of authentication server 212.

For example, when the user logs out, authentication server 212 may send a message to each web server on the list of sites visited. Each message is a request for the web server to delete any cookies such web server placed on client computer system 202 (e.g., through a browser running on client computer system 202).

As may be appreciated, cookies written to client computer system 202 by authentication server 212 cannot be read by any affiliate server 206, 208, 210. Similarly, cookies written to client computer system 202 by a particular affiliate server 206 cannot be read by any other affiliate server 208, 210 or authentication server 212. The cookies written by an affiliate server 206 are typically encrypted using a key that is unique to affiliate server 206, thereby preventing other affiliate servers 208, 210 and authentication server 212 from reading the data stored in such cookies.

Authentication server 212 also communicates the user profile information for the user to affiliate server 206, 208, 210, as shown in step 330, through client computer system 202. The user of client computer system 202 can specify during the registration process what types of profile information should be provided to various types of web servers. For example, a user may specify that all commerce-related web servers should receive the user's mailing address, but restrict the mailing address from all other types of web sites.

After receiving the user's profile information, affiliate server 206 may generate a personalized web page for the user and communicate the generated web page to the user's browser, as represented in step 335. Additionally, affiliate server 206 may copy one or more cookies to client computer system 202, which include information confirming that the user of client computer system 202 has been authenticated and stating the period of time during which the authentication is valid. Each time the user enters a new web page request on the same affiliate server 206, the data in the cookie is copied to the affiliate server 206 along with the page request. Thus, the cookies vouch for the user at each page request and affiliate server 206 need not repeatedly check the authentication of a user during each subsequent page request.

However, if a particular period of time has passed (referred to as a timeout period) since the last authentication process by authentication server 212, then affiliate server 206 may request a re-authorization of the user. In this situation, the user is asked to refresh his/her authorization by re-entering a login ID and password. If the entered information is valid, then the timeout period is reset and the existing cookie(s) from affiliate server 206 are replaced with new cookie(s) containing the new timeout information.

If the user of client computer system 202 is new to affiliate server 206, then affiliate server 206 may request additional user information that is not already contained in the user profile for the user. The additional information may include information unique to affiliate server 206 (e.g., account number, etc.) or information about the user's preferences and how the user intends to use affiliate server 206. Thus, although the user generates a user profile that is stored on the authentication server, the user may be required, for example, during an initial visit to an affiliate server 206, to provide additional information for the benefit of affiliate server 206. Affiliate server 206 can then store such additional information such that the user need not be required to re-enter the data during subsequent visits to the same affiliate server.

When a child attempts to access affiliate server 206, the child and the affiliate server go through a series of steps as outlined above in connection with FIG. 3. However, and importantly, at some point affiliate server 206 and/or authentication server 212 determines that the child is in fact a child within the scope of COPPA and therefore parental consent for the child must be obtained. Therefore, prior to providing access to affiliate server 206, authentication server 212 needs to obtain parental consent for the child to access the affiliate server 206.

Figure 4:
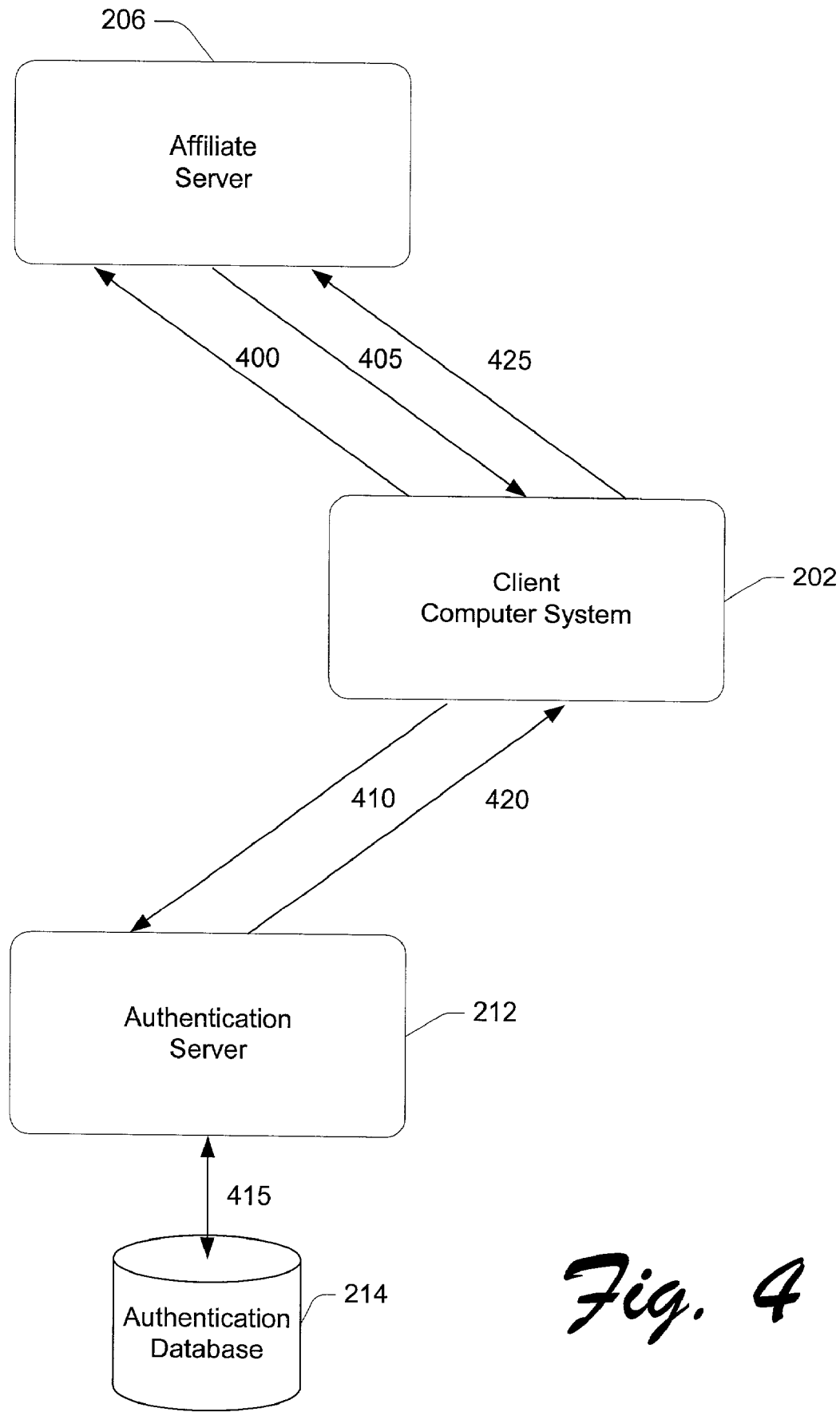
FIG. 4 is a flow diagram illustrating an interaction between a child user at a client computer system, an affiliate server and an authentication server, in accordance with certain exemplary implementations of the present invention.

In FIG. 4, an exemplary interaction between a child at client computer system 202, an affiliate server 206 and an authentication server 212 are presented. As shown, in this example, the child is seeking access to affiliate server 206, which requires parental consent to be accessed by this child user.

As shown, at step 400, the child accesses content of affiliate server 206. Typically, this is accomplished by typing in the affiliate server's URL or clicking on a hyperlink associated with such URL. In the manner as discussed above in connection with FIG. 3, affiliate server 206 redirects the web browser of the child's computer system 202 to the authentication server 212, per steps 405 and 410.

Assuming the child has not yet logged into authentication server 212, authentication server 212 generates a sign-in web page and communicates the web page to client computer system 202 for display on the child's browser, as shown by step 415. The child then fills-in the requested information on the sign-in web page and clicks a "sign-in" button or the like on the web page to send the information entered to authentication server 212, per step 420.

Upon receiving the information from the child, and upon confirming the validity of information, authentication server 212 notes that the child is in fact a child. Authentication server 212 may make such a determination in any appropriate manner. For example, the authentication server may use the child's birthday to determine if the child is in fact a child according COPPA or some other predetermined criteria.

Authentication server 212 then searches in the user profile of the child in the authentication database to determine whether such user profile contains the appropriate consent information that permits the child to access affiliate server 206. If the user profile of the child contains consent information providing consent for the child to access affiliate server 206, then authentication server 212 directs the child's browser back to affiliate server 206, as shown in steps 420 and 425. Affiliate server 206 then grants access, to the extent of such consent information, to the child.

However, if the user profile of the child contains consent information that denies access to affiliate server 206, then authentication server 212 again directs the child's browser to affiliate server 206, per steps 420 and 425. However, in this case affiliate server 206 denies access to the child. Here, for example, affiliate server 206 or authentication server 212 may communicate to the child that the child does not have consent to access affiliate server 206.

Additionally, authentication server 212 may not find any consent information at the authentication database 214 in the user profile of the child relating to affiliate server 206. In this case, affiliate server 206 or authentication server 212 may communicate to the child that parental consent is needed to access affiliate server 206. Here, the child would need to notify the parent about the need for consent to be added to the user profile of the child in order for the child to access affiliate server 206.

In certain exemplary implementations, the consent information can be in the form of different levels of consent. For example, the consent information in the user profile of the child may grant the child access to a particular affiliate server 206. However, such consent information may also restrict access to certain portions of affiliate server 206. Other levels of consent may be used, such as, for example, consent restricting access to affiliate server 206 at certain times.

Figure 5:
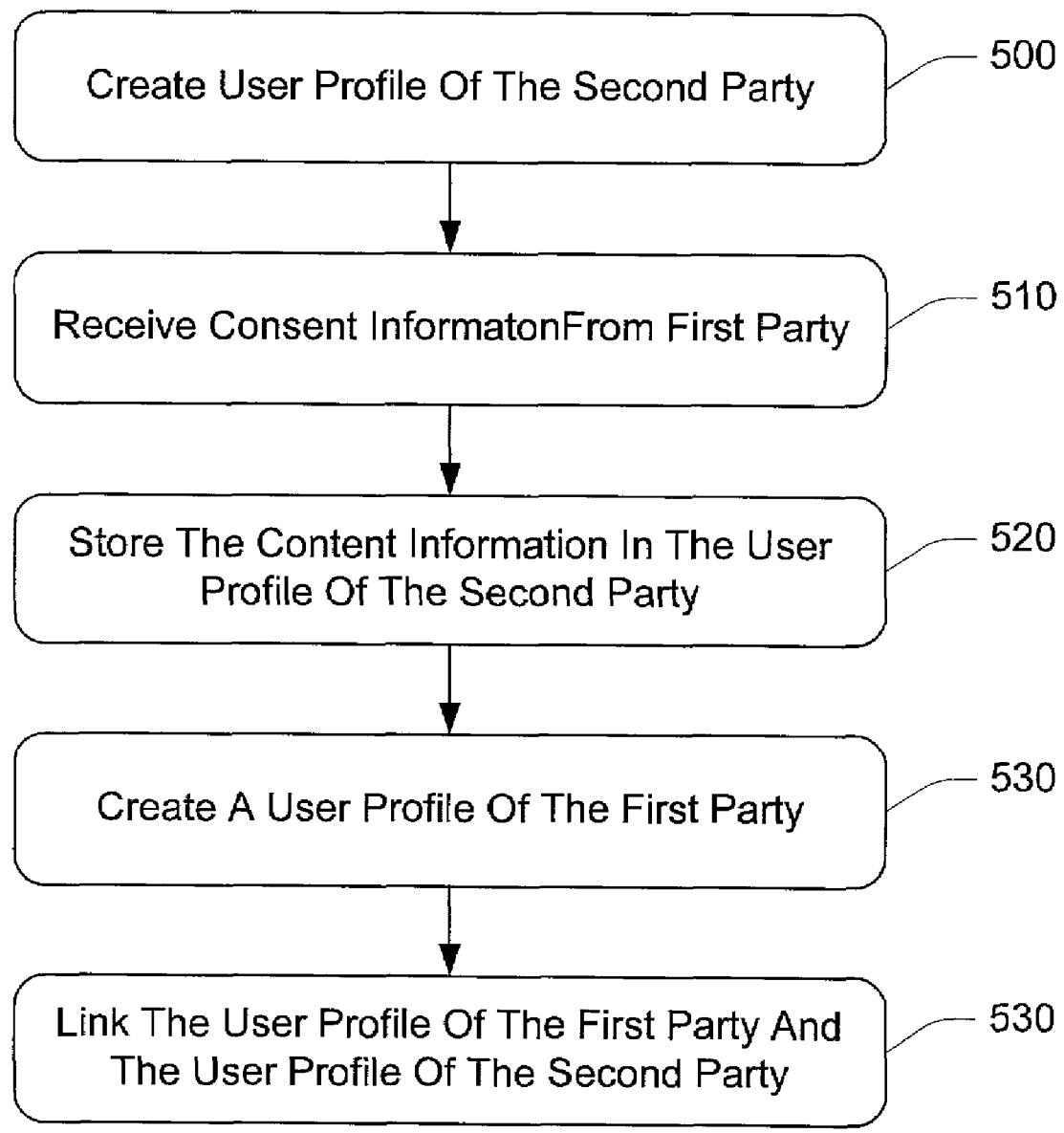
FIG. 5 is a flow chart depicting a method suitable for use with an authentication server, in accordance with certain exemplary implementations of the present invention

Reference is now made to FIG. 5, wherein steps implemented by authentication server 212 of FIG. 4 are shown.

At step 500, a user profile is created for the child at authentication server 212. The user profile of the child can be created prior to or as part of the present process. Such user profile may include information such as the name, address, age, user name, password and other information of the child. Either the child or the parent may create the user profile of the child. Furthermore, age information may already be included in the user profile of the child or may have to be added as part of the present process. For example, the child may have a user profile but never accessed an affiliate server that requires age information, such as for example, those servers that fall outside the scope of COPPA. Therefore, when a child attempts to access an affiliate server that is within the scope of COPPA, either authentication server 212 or an affiliate server 206, 208, 210 must retrieve such age information from the child.

Regardless of who creates the user profile and when, the parent at some point must provide consent information with regard to the affiliate server to be stored in the user profile of the child. It should be appreciated that the parent can be given the opportunity to provide the consent information in various manners. For example, the child can request the assistance of the parent, or the authentication server can notify the parent by way of email.

After being prompted to supply the consent information, the parent supplies such consent information to authentication server 212. At step 510, the authentication server receives such consent information. As may be appreciated, the consent information from the parent provides or denies the child access to the affiliate server. In certain exemplary implementations, for example, the parent may be provided with a list of affiliate servers that the adult may selectively choose to provide or deny consent for the child to access. After receiving such consent information from the parent, the consent information is then stored in the user profile of the child, as shown in step 520. Subsequently, the child may access affiliate servers 206 to which the parent has in fact consent provided consent and may not access those affiliate servers 206 to which the parent has in fact denied consent.

At step 530, the parent and authentication server 212 in combination create a user profile of the parent with appropriate user information. Thereafter, authentication server 212 logically links the user profile of the parent and the user profile of the child in an appropriate manner, as shown in step 540.

Once linked, the parent, by way of the user profile of the parent, may access and modify any previously given consent information in the user profile of the child. In this manner, authentication server 212 can receive modified consent information from the parent. The authentication server may replace the previous consent information in the user profile of the child with the modified consent information. The child may then access applicable affiliate servers 206, 208, 210 in accordance with the modified consent information in the user profile thereof.

Once linked, only the parent by way of the user profile of the parent can modify the consent information in the user profile of the child. Such a limitation and the aforementioned link may, for example, be achieved by placing in the user profile of the parent a pointer to the user profile of the child and/or by placing in the user profile of the child a pointer to the user profile of the parent.

Figure 6:
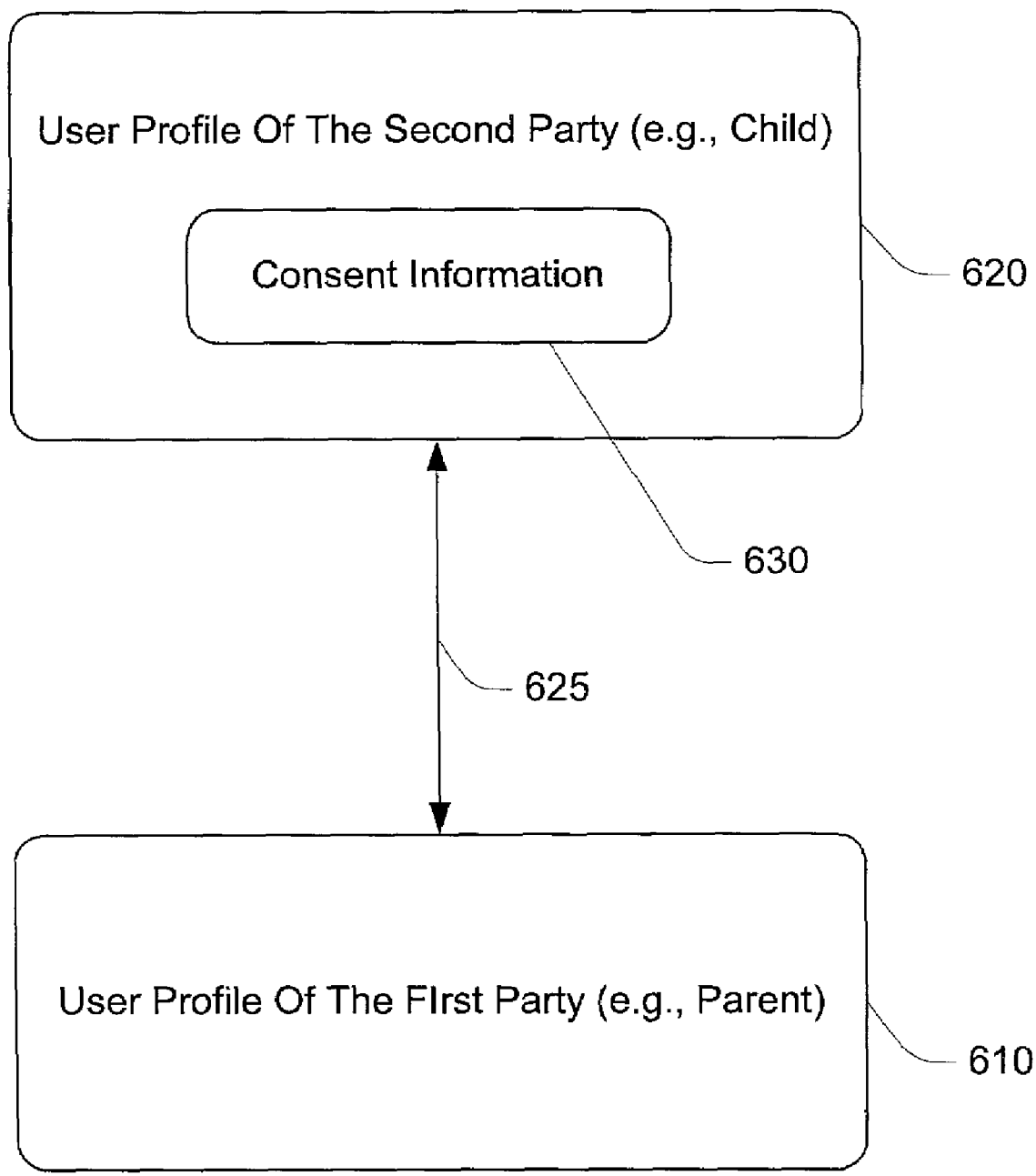
FIG. 6 is a block diagram illustrating two user profiles operatively/logically linked together, in accordance with certain exemplary implementations of the present invention.

In FIG. 6, a user profile 610 of the child and a user profile 620 of the parent are illustratively depicted. Profiles 610, 620 are logically connected by the aforementioned link demonstratively shown as element 625. As may be appreciated, link 625 may be employed to allow the parent and the child to communicate using the user profiles 610, 620. For example, the child may request consent to access an affiliate server 206 from the parent via the user profiles 610, 620 if the parent has not already given such consent to access. In response, the parent may provide or deny consent again via the profiles 610, 620; here, through the user profile of the first party.

As shown, consent information 630 for the child is includes in user profile 620 of the child. It should be appreciated that consent information 630 could also be included in user profile 610 of the parent or both profiles 610, 620.

Basically, the user profile of the first party may be logically linked to multiple user profiles of multiple second parties. Also, the user profile of the second party may be logically linked to multiple user profiles of multiple first parties. For example, the user profile of a child may be logically linked to a user profile of the child's father and the user profile of the child's mother. Conversely, the user profile of the mother may be logically linked to the user profile of the mother's first child as well as the user profile of the mother's second child.

Before a parent is allowed to provide consent information for a child, the parent should be verified as an adult. Adult verification assures that the parent is of proper age to provide consent information. One common method of verifying the parent as an adult is through a credit card check. In this manner, authentication server 212 requests the parent enter a credit card number. Then, authentication server 212 checks whether the parent entered a valid credit card number. If so, authentication server 212 allows the parent to proceed in the process of providing consent information for a child. If not, authentication server 212 will not allow the parent to proceed. Additionally, the parent need only be verified as an adult once, such that, once verified, the adult may provide modified or additional consent without going through the adult verification process again.

With this basic multiple party consent-based authentication process in mind, attention is now drawn to certain further improvements, in accordance with certain exemplary implementations of the present invention.

Certain provisions in COPPA requires that parents be allowed to access and possibly modify any data collected by authentication server 212 and/or affiliate servers 206, 208, 210. Thus, for example, a parent needs to be provided with the ability to access and edit user profile 620 of the child, and also any additional information collected with regard to the child.

In accordance with certain aspects of the present invention, therefore, methods and arrangements are provided which allow parents to access and edit user profile 620 of the child, and also any additional information collected with regard to the child, for example, by an affiliate server. In this manner, parental controls may be expanded across a network of online services without requiring any significant additional client side software. Parents can be provided with a single, centralized location through which to review information about their child. The methods and arrangements may be implemented to provide additional features, such as, for example, providing a way for parents to control how their child interacts with certain online services provided through affiliate servers. For example, a parent may selectively specify who can send email to the child, who can be a buddy to the child, etc. The methods and arrangements also provide a COPPA compliant solution to affiliate servers that would otherwise be forced to invest their own resources to develop an appropriate solution that in some way logically linked the parent and child together.

With this in mind, a validation protocol or validation code has been built to work in conjunction with or as part of existing authentication processes, for example, as described above. This validation code, which can be sent from authentication server 212, essentially allows the receiving affiliate server(s) to know which child record a parent wishes to access and/or possibly modify. The validation code does not require the affiliate server and/pr client computer system 202 to determine, know or otherwise store any record of the applicable parent child relationship.

In certain implementations, the validation code is provided to affiliate servers in addition to the previously described sign-in information. This format or what can be referred to a validation protocol provided the affiliate server with a way to retrieve locally maintained data about the child without having the child's authentication credentials (i.e., the child need not be signed-in).

Rather than checking the received user profile for the child's member ID, the validation protocol provides a mechanism to share the child member ID related to the parent currently signed-in. While this provides the necessary functionality it also provides affiliate servers with the ability to correlate parent and child accounts should they decide to do so in their databases. For example, this may be useful in providing additional services to either the parent or child.

In certain implementations, the validation protocol can be engaged from either authentication server 212 and/or an affiliate server 206, 208, 210, for example, depending on how the parent is trying to access a child's data.

In either case, the validation protocol is communicated to the applicable affiliate server, preferably in an encrypted manner. For example, authentication server can pass an encrypted query string parameter that includes the member ID of the child. The affiliate server can then decrypt the query string parameter and access the child's member ID.

One possible exemplary un-encrypted format of a query string parameter is shown in the following table.

| Value | Name | Description | Values |
| --- | --- | --- | --- |
| Child MemIDHigh | CMIDH | The child account's ID appropriate for each affiliate server | 32 bit High value |
| Child MemIDLow | CMIDL | The child account's ID appropriate for each affiliate server | 32 bit Low value |
| Child MemberName | CMN | Child's sign-in name and/or domain | Up to 128 bytes |
| Parent MemIDHigh | PMIDH | The parent account's ID appropriate for each affiliate server. This should match the current user's cookie | 32 bit High value |
| Parent MemIDLow | PMIDL | The parent account's ID appropriate for each affiliate server. This should match the current user's cookie | 32 bit Low value |
| Child | CAS | Child's account status. | Allowed values: |

-continued

| Value | Name | Description | Values |
|---|---|---|---|
| Account Status | | Used to communicate changes in consent status. | 0 = No Consent<br>1 = Limited Consent<br>2 = Full Consent |

To validate the parent, the affiliate server should compare the PMIDH and PMIDL to the member ID high and low values in the current sign-in cookies. If the match, then the affiliate server can be sure that the validation code and current user match and can subsequently return the child's data for review/editing by the parent. If they do not match, then the affiliate server should return an error code, for example, or perhaps can request a new validation code argument by redirecting the user to the authentication server.

The validation protocol should therefore provide affiliate servers with enough information to lookup a child's data and perform the appropriate action (e.g., allow the parent to view/edit data, delete data, etc.).

Figure 7:
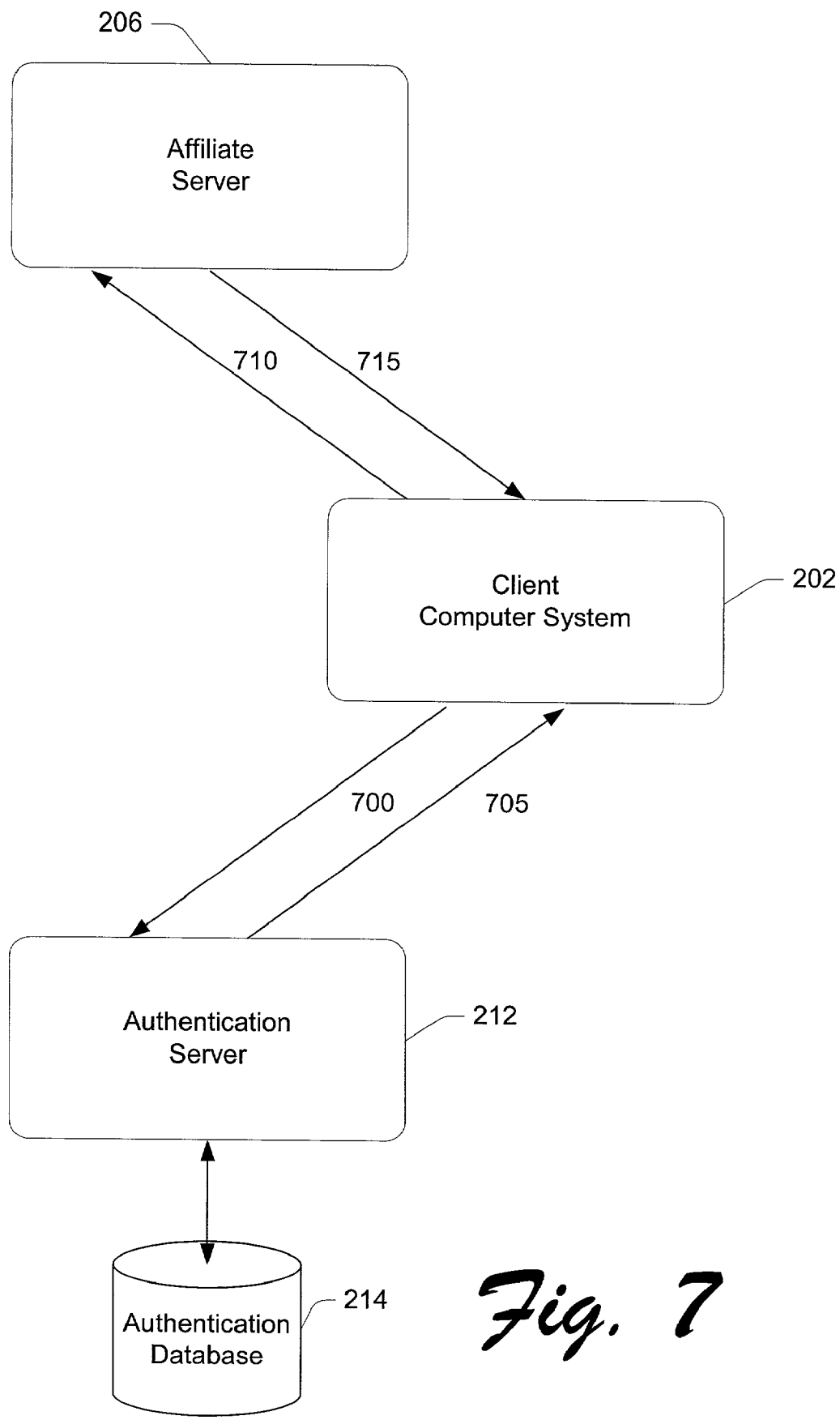
FIG. 7 is a flow diagram illustrating an interaction between a parent user at a client computer system, an affiliate server and an authentication server, wherein the parent is permitted to review/edit information associated with a child, in accordance with certain exemplary implementations of the present invention.
Figure 8:
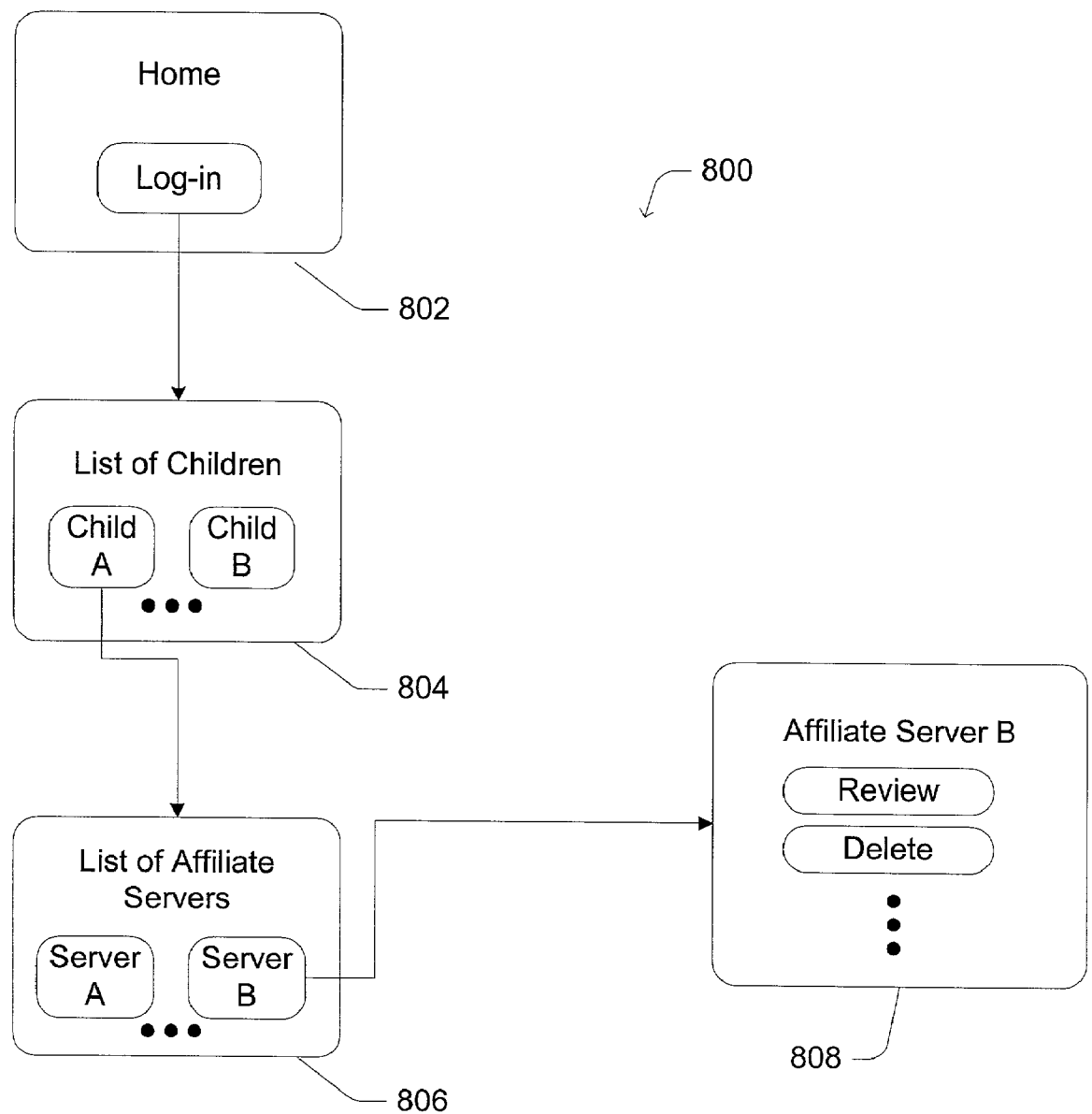
FIG. 8 is an illustrative diagram depicting an interactive session between a parent user at a client computer system, an affiliate server and an authentication server, wherein the parent is permitted to review/edit information associated with a child, in accordance with certain exemplary implementations of the present invention.

FIG. 7 depicts an exemplary workflow associated with one such validation code. Here, a parent user of client computer system 202 logs-in to authentication server 212, as shown in step 700. Upon indicating that the parent wishes to review and/or possible edit information about a child with regard to a specific affiliate server 206, authentication server 212, via steps 705 and 710, provides the applicable validation code to affiliate server 710. For example, the validation code can be configured according to information about the parent-child relationship as maintained in authentication database 214 In response, affiliate server 206 provides an appropriate user interface (UI) to the parent at client computer system 202. The UI allows the parent to view information, including, for example, consent information, about the child with respect to affiliate server 206 FIG. 8 is block diagram that illustratively depicts an exemplary session 800 in which the parent logs-in to authentication server 212 seeking to review and/or edit information about a child. Session 800 depicts a plurality of web pages (e.g., user interfaces). Here, web page 802 is the "home" page for authentication server 212. Web page 802 is configured to allow the parent to sign-in. Once signed in, the parent can navigate to web page 804. In web page 804, a list of children associated with the parent is presented. In this example, the parent may select a child by clicking on the appropriate button/link. Here, as illustrated, the parent has selected "child A". Next, via web page 806, the parent is presented with a list of affiliate servers associated with the child. The child will either have some form of consent or lack thereof for each of these affiliate servers. In this example, the parent has selected "affiliate server B". This directs the parent to a web page 808 associated with affiliate server B, wherein the parent will be provided with review/editing capabilities with regard to the child's information, consent status, etc. As described above, to review and/or edit the child's information, for example, via web page 808, the affiliate server B will need to receive the applicable validation code from the authentication server.

In other sessions/configurations (not shown), the parent may also login to the affiliate server, which would then need to request a validation code from the authentication server.

To provide a more family-friendly network environment, a parent can also proactively create a parent-child relationship. Thus, for example, a parent may choose to create a parent-child relationship even though the child may be over the COPPA defined age of 13 years.

Thus, although some preferred implementations of the various methods and arrangements of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method comprising:
   associating a first entity with a second entity in a first device;
   determining whether to provide information about the association of the first and second entities to a second device as directed by the first entity;
   in response to the determining, providing the information to a second device without the second entity being logged in to either the first or second device, the providing further includes providing the second device with a validation code that identifies the first entity and the second entity, when the first entity is operatively associated with the second device, wherein the validation code identifies modifications to a consent parameter associated with the second entity; and
   facilitating access of the second entity to the second device based on the information.

2. The method as recited in claim 1, wherein the first entity and the second entity are selected from a group of entities that includes users, organizations, companies, devices, computers, servers, computer programs, and applications.

3. The method as recited in claim 1, wherein the validation code identifies the second entity by an identifier and a name.

4. The method as recited in claim 1, wherein providing the second device with the validation code further includes encrypting at least a portion of the validation code.

5. The method as recited in claim 1, wherein associating the first entity with the second entity in the first device further includes logically associating a first entity profile with a second entity profile.

6. The method as recited in claim 1, wherein the first entity is a parent/guardian of the second entity.

7. The method as recited in claim 1, wherein the first device includes a network server that is configured to act as an authentication server.

8. The method as recited in claim 7, wherein the second device includes a network server that is configured to act as an affiliated server associated with the authentication server.

9. A computer-readable storage medium having stored thereon computer-executable instructions, comprising:
   associating a first entity with a second entity in a first device;
   causing the first device to determine whether to provide information about the association of the first and second entities to a second device as directed by the first entity;
   in response to the determining, causing the first device to provide the information to the second device without the second entity being logged in to either the first or second device and also causing the first device to provide the second device with a validation code that identifies the first entity and the second entity, when the first entity is operatively associated with the second device, wherein the validation code identifies modifications to a consent parameter associated with the second entity; and
   facilitating access of the second entity to the second device based on the information.

10. The computer-readable medium as recited in claim 9, wherein the first entity and the second entity are selected from a group of entities that includes users, organizations, companies, devices, computers, servers, computer programs, and applications.

11. The computer-readable storage medium as recited in claim 9, wherein the validation code identifies the second entity by an identifier and a name.

12. The computer-readable medium as recited in claim 9, wherein causing the first device to provide the second device with the validation code further includes encrypting at least a portion of the validation code.

13. The computer-readable medium as recited in claim 9, wherein associating the first entity with the second entity in the first device further includes logically associating a first entity profile with a second entity profile.

14. The computer-readable medium as recited in claim 9, wherein the flit user is a parent/guardian of the second user.

15. The computer-readable medium as recited in claim 9, wherein the first device includes a network sewer that is configured to act as an authentication server.

16. The computer-readable medium as recited in claim 15, wherein the second device includes a network server that is configured to act as an affiliated server associated with the authentication server.

17. An apparatus comprising:
memory having information associating a first user of the apparatus with a second user of the apparatus; and
logic operatively coupled to the memory and configured to respond to inputs from the first user by determining whether to output information about the association of the first and second users to a second device as directed by the first user;
outputting the information to the second device without the second user being logged into the apparatus; and
facilitating access of the second user to the second device based on the information;
wherein the logic is configurable to be operatively connected to at least one external device and is further configured to selectively output the information within a validation code that identifies the first user and the second user, when the first user signs-in to the external device; and
the validation code facilitates the first user to review the information, wherein the validation code identifies modifications to a consent parameter associated with the second user.

18. The apparatus as recited in claim 17, wherein the validation code identifies the second user by an identifier and a name.

19. The apparatus as recited in claim 17, wherein the logic is further configured to encrypt at least a portion of the validation code.

20. The apparatus as recited in claim 17, wherein the logic is further configured logically associate a first user profile with a second user profile in the memory.

21. The apparatus as recited in claim 17, wherein the first user is a parent/guardian of the second user.

22. The apparatus as recited in claim 17, wherein the apparatus is included in a network server that is configured to act as an authentication server.

23. The apparatus as recited in claim 22, wherein the external device includes a network server that is configured to act as an affiliated server associated with the authentication server.

24. A computer-readable medium having stored thereon a data structure, comprising:

a validation code that identifies a first entity and a second entity, wherein the validation code identifies modifications to a consent parameter associated with the second entity; and
a user profile of the second entity with consent information designated by the first entity, wherein the validation code facilitates the first entity to review the consent information and the consent information facilitates the second entity to access a server.

25. The computer-readable medium as recited in claim 24, wherein the first entity and the second entity are selected from a group of entities that includes users, organizations, companies, devices, computers, servers, computer programs, and applications.

26. The computer-readable medium as recited in claim 24, wherein the validation code identifies the second entity by an identifier and a name.

27. The computer-readable medium as recited in claim 26, wherein at least a portion of the validation code is encrypted.

28. An apparatus comprising:
memory; and
logic operatively coupled to the memory and configured to allow a first entity to be operatively associated with the apparatus, determine whether to provide information about the association of the first entity and at least one other entity to a second device as directed by the first entity, and receive the information without the at least one other entity being logged in to the apparatus, wherein:
the first entity includes a first user, the at least one other entity includes a second user,
without requiring the at least one other entity to be operatively associated with the apparatus includes without requiring the second user to be logged in to the apparatus,
the validation code identifies modifications to a consent parameter associated with the at least one other entity.

29. The apparatus as recited in claim 28, wherein the first entity and the at least one other entity are selected from a group of entities that includes users, organizations, companies, devices, computers, servers, computer programs, and applications.

30. The apparatus as recited in claim 28, wherein the logic is configurable to receive the information about the association from an external device via a validation code that identifies the first entity and the at least one other entity, when the first entity is operatively associated with the external device.

31. The apparatus as recited in claim 28, wherein the validation code identifies the at least one other entity by an identifier and a name.

32. The apparatus as recited in claim 28, wherein the logic is further configured to decrypt the validation code, as needed.

33. The apparatus as recited in claim 28, wherein, in response to the validation code, the logic is further configurable to output previously gathered information relating to the at least one other entity to the external device.

34. The apparatus as recited in claim 28, wherein the first user is a parent/guardian of the second user.

35. The apparatus as recited in claim 28, wherein the apparatus is included in a network server that is configured to act as an affiliate server.

36. The apparatus as recited in claim 28, wherein the external device includes a network server that is configured to act as an authentication server.

* * * * *

UNITED STATES PATENT AND TRADEMARK OFFICE
CERTIFICATE OF CORRECTION

PATENT NO. : 7,467,298 B2  Page 1 of 1
APPLICATION NO. : 09/836584
DATED : December 16, 2008
INVENTOR(S) : Christopher E. Mitchell et al.

It is certified that error appears in the above-identified patent and that said Letters Patent is hereby corrected as shown below:

In column 15, line 18, in Claim 14, delete "flit" and insert -- first --, therefor.

In column 15, line 20, in Claim 15, delete "sewer" and insert -- server --, therefor.

Signed and Sealed this
Third Day of May, 2011

David J. Kappos
*Director of the United States Patent and Trademark Office*